(12) United States Patent
Yoshimura

(10) Patent No.: US 10,526,485 B2
(45) Date of Patent: Jan. 7, 2020

(54) POLYAMIDE RESIN COMPOSITION HAVING THERMAL AGING RESISTANCE AND METHOD FOR ENHANCING THERMAL AGING RESISTANCE OF POLYAMIDE RESIN

(71) Applicant: TOYOBO CO., LTD., Osaka (JP)

(72) Inventor: Nobuhiro Yoshimura, Shiga (JP)

(73) Assignee: TOYOBO CO., LTD., Osaka (JP)

( * ) Notice: Subject to any disclaimer, the term of this patent is extended or adjusted under 35 U.S.C. 154(b) by 63 days.

(21) Appl. No.: 15/742,170

(22) PCT Filed: Jul. 22, 2016

(86) PCT No.: PCT/JP2016/071559
§ 371 (c)(1),
(2) Date: Jan. 5, 2018

(87) PCT Pub. No.: WO2017/018346
PCT Pub. Date: Feb. 2, 2017

(65) Prior Publication Data
US 2018/0194942 A1    Jul. 12, 2018

(30) Foreign Application Priority Data

Jul. 29, 2015 (JP) .................... 2015-149743

(51) Int. Cl.
| | |
|---|---|
| C08L 77/00 | (2006.01) |
| C08L 77/06 | (2006.01) |
| C08K 3/28 | (2006.01) |
| C01C 3/12 | (2006.01) |
| C08K 3/08 | (2006.01) |

(52) U.S. Cl.
CPC ............... *C08L 77/00* (2013.01); *C01C 3/12* (2013.01); *C08K 3/08* (2013.01); *C08K 3/28* (2013.01); *C08L 77/06* (2013.01); *C08K 2003/085* (2013.01); *C08K 2003/0856* (2013.01)

(58) Field of Classification Search
None
See application file for complete search history.

(56) References Cited

U.S. PATENT DOCUMENTS

| 3,519,595 A | 7/1970 | Hermann et al. | |
|---|---|---|---|
| 2011/0200784 A1* | 8/2011 | Agarwal | D01F 1/07 428/97 |

FOREIGN PATENT DOCUMENTS

| JP | 62-290759 | 12/1987 |
|---|---|---|
| JP | 3-76755 | 4/1991 |
| JP | 5-98153 | 4/1993 |
| JP | 2006-528260 | 12/2006 |
| JP | 2007-231094 | 9/2007 |
| JP | 2008-527127 | 7/2008 |
| JP | 2008-527129 | 7/2008 |
| JP | 2010-270318 | 12/2010 |
| JP | 2012-500305 | 1/2012 |
| JP | 2016-53150 | 4/2016 |
| JP | 2016-138192 | 8/2016 |

OTHER PUBLICATIONS

International Search Report dated Oct. 25, 2016 in International (PCT) Application No. PCT/JP2016/071559.

* cited by examiner

*Primary Examiner* — Ana L. Woodward
(74) *Attorney, Agent, or Firm* — Wenderoth, Lind & Ponack, L.L.P.

(57) ABSTRACT

The present invention is a polyamide resin composition having a thermal aging resistance in a level which is resistant to a high-temperature and long-term environment of 200° C. and longer than 1000 hours. According to the present invention, there is provided a polyamide resin composition containing a polyamide resin (A) and another polyamide resin (B) which exhibits lower oxygen permeability than the polyamide resin (A), wherein a ratio by mass (A)/(B) of the polyamide resin (A) to the polyamide resin (B) is from 98/2 to 60/40, and wherein, to 100 parts by mass of the total amount of the polyamide resin (A) and the polyamide resin (B), 0.5 to 20 part (s) by mass of a metal cyanide salt of a composition formula (1) is compounded.

6 Claims, No Drawings

POLYAMIDE RESIN COMPOSITION HAVING THERMAL AGING RESISTANCE AND METHOD FOR ENHANCING THERMAL AGING RESISTANCE OF POLYAMIDE RESIN

TECHNICAL FIELD OF THE INVENTION

The present invention relates to a polyamide resin composition having excellent thermal aging resistance.

BACKGROUND ART

Since a polyamide resin has excellent characteristics such as mechanical characteristics as well as resistance to chemicals and moldability, it has been widely utilized in various parts such as automobile parts, electric and electronic parts and industrial machine parts. Although a polyamide resin is relatively excellent in thermal aging resistance, deterioration by the action of heat and light is unavoidable. As to a method for enhancing thermal aging resistance of a polyamide resin, methods wherein copper halide, potassium halide, oxazole compound or the like is added as a thermostabilizer have been known from old time already (for example, Patent Document 1).

As a result of the art as such, a polyamide resin is used in the parts for the use being exposed to high-temperature environments of about 140° C. in the fields of automobile parts and electric and electronic parts.

However, with regard to engine room of automobiles for example, environmental temperature in the engine room has become high as a result of increase in engine output, tendency of arranging the parts with high density, etc. in recent years and there has been a demand for high level of thermal aging resistance which has not been aimed until now.

In order to fulfill this demand, there have been proposed a method wherein polyamide is compounded with finely granulated element iron (Patent Document 2), a method wherein polyamide is compounded with finely granulated and dispersed metal powder (Patent Document 3), a method wherein a mixture of two kinds of polyamides having different melting points from each other is compounded with a copper compound and iron oxide (Patent Document 4), a method wherein polyamide is compounded with a thermostabilizer such as copper iodide or potassium iodide and a composite oxide such as tri-iron tetraoxide (containing iron (II) oxide) (Patent Document 5), etc. It has been said that the products obtained by these methods are excellent in thermal aging resistance even under the environment of as high as about 200° C.

However, in the methods of Patent Documents 2 and 3, there is a danger of ignition during preparation of a composition whereby the preparation is not easy. In the method of Patent Document 4, there is a disadvantage that the effect is achieved only by a very limited composition. In the method of Patent Document 5, there may be the case wherein stability and reproducibility of the thermal aging resistance and the mechanical strength are inferior. As such, any of them is to be still improved.

PRIOR ART DOCUMENTS

Patent Documents

Patent Document 1: Japanese Patent Pregrant Publication (JP-B) No. 47690/95

Patent Document 2: Japanese Patent Application Laid-Open (JP-A) No. 2006-528260
Patent Document 3: Japanese Patent Application Laid-Open (JP-A) No. 2008-527127
Patent Document 4: Japanese Patent Application Laid-Open (JP-A) No. 2008-527129
Patent Document 5: Japanese Patent Application Laid-Open (JP-A) No. 2010-270318

DISCLOSURE OF THE INVENTION

Problem that the Invention is to Solve

The problem to be solved by the present invention is to provide a method for enhancing thermal aging resistance of a polyamide resin, wherein the thermal aging resistance in a level which is resistant to a high-temperature and long-term environment of 200° C. and longer than 1000 hours can be easily and stably imparted to the polyamide resin and is also to provide a polyamide resin composition having excellent thermal aging resistance and excellent mechanical characteristics prepared by the above method.

Means for Solving the Problem

In order to solve the above problem, the inventors conducted eager studies, and found that the thermal aging resistance of a polyamide resin can be expressed by compounding it with a metal cyanide salt. Further, as a result of repeated eager studies, it has been found that the metal cyanide salt enhances a gas barrier property of the polyamide resin with a high possibility. Then, thinking of further enhancement of the gas barrier property, the inventors searched for a polyamide resin which can enhance the gas barrier property by supplementary compounding with a base polyamide resin, whereupon the present invention has now been achieved.

Thus, the present invention is as follows.

[1] A polyamide resin composition containing a polyamide resin (A) and another polyamide resin (B) which exhibits lower oxygen permeability than the polyamide resin (A), wherein a ratio by mass (A)/(B) of the polyamide resin (A) to the polyamide resin (B) is from 98/2 to 60/40, and wherein, to 100 parts by mass of a total amount of the polyamide resin (A) and the polyamide resin (B), 0.5 to 20 part (s) by mass of a metal cyanide salt of a following composition formula (1) is compounded.

$$A_x[M(CN)_y] \qquad \text{General composition formula (1)}$$

(In the general composition formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A.)

[2] The polyamide resin composition according to [1], wherein M in the general composition formula (1) is iron.

[3] The polyamide resin composition according to [1], wherein the metal cyanide salt in the general composition formula (1) is one or more member(s) selected from the group consisting of alkali metal hexacyanoferrate (II) and alkali metal hexacyanoferrate (III).

[4] The polyamide resin composition according to any of [1] to [3], wherein, to 100 parts by mass of the total amount of the polyamide resin (A) and the polyamide resin (B), a copper compound is compounded in an amount of 0.0001 to 1 part by mass as copper.

[5] The polyamide resin composition according to any of [1] to [4], wherein the polyamide resin (A) is polyhexamethyleneadipamide.

[6] A method for enhancing thermal aging resistance of a polyamide resin composition, wherein the polyamide resin composition contains a polyamide resin (A) and another polyamide resin (B) which exhibits lower oxygen permeability than the polyamide resin (A), wherein a ratio by mass (A)/(B) of the polyamide resin (A) to the polyamide resin (B) is from 98/2 to 60/40, and wherein, to 100 parts by mass of a total amount of the polyamide resin (A) and the polyamide resin (B), 0.5 to 20 part (s) by mass of a metalcyanide salt having a following general composition formula (1) is compounded:

$$A_x[M(CN)_y]$$ General composition formula (1)

(In the general composition formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A.)

Advantages of the Invention

In accordance with the present invention, it is now possible to provide a polyamide resin composition which exhibits excellent thermal aging resistance, and which can maintain high strength even under a high-temperature and long-term environment of 200° C. and longer than 1000 hours.

BEST MODE FOR CARRYING OUT THE INVENTION

Hereinafter, the present invention will be specifically illustrated.

The polyamide resin which can be used in the present invention is not particularly limited. Examples thereof include an open-ring polymer of cyclic lactam, a polycondensate of amino carboxylic acid, a polycondensate of dibasic acid with diamine and copolymers thereof. Specific examples thereof include an aliphatic polyamide such as polycaproamide (polyamide 6), polyhexamethyleneadipamide (polyamide 66), polytetramethyleneadipamide (polyamide 46), polyhexamethylenesebacamide (polyamide 610), polyhexamethylenedodecamide (polyamide 612), polydecamethylenesebacamide (polyamide 1010), poly-lauryllactam (polyamide 12) and poly-11-aminoundecanoic acid (polyamide 11); an aliphatic-aromatic polyamide such as poly-m-xyleneadipamide (polyamide MXD6), polyhexamethyleneterephthalamide (polyamide 6T), polydecamethyleneterephthalamide (polyamide 10T), polyhexamethyleneisophthalamide (polyamide 6I), polynonamethyleneterephthalamide (polyamide 9T) and polytetramethyleneisophthalamide (polyamide 4I); and copolymers and mixtures thereof. As to the polyamide which is particularly advantageous in the present invention, there may be exemplified polyamide 6, polyamide 66, polyamide 6/66 copolymer, polyamide 66/6T copolymer, polyamide 6T/12 copolymer, polyamide 6T/11 copolymer, polyamide 10T/11 copolymer, polyamide 6T/6I copolymer, polyamide 6T/6I/12 copolymer, polyamide 6T/610 copolymer and polyamide 6T/6I/6 copolymer.

The polyamide resin in the present invention needs to be a polyamide resin composition containing a polyamide resin (A) and another polyamide resin (B) which exhibits lower oxygen permeability than the polyamide resin (A), wherein a ratio by mass (A)/(B) of the polyamide resin (A) to the polyamide resin (B) is from 98/2 to 60/40.

The polyamide resin (A) is not particularly limited, and the polyamide resins as exemplified above can be used. Among them, polycaproamide (polyamide 6), polyhexamethyleneadipamide (polyamide 66), polyhexamethylenesebacamide (polyamide 610), polydecamethylenesebacamide (polyamide 1010), polyamide 6T/11 copolymer and polyamide 10T/11 copolymer are preferred. Polycaproamide (polyamide 6) and polyhexamethyleneadipamide (polyamide 66) are more preferred. Polyhexamethyleneadipamide (polyamide 66) is particularly preferred.

Examples of the combination will be given hereunder. When the polyamide (A) is polyhexamethyleneadipamide (polyamide 66), examples of the polyamide (B) are aliphatic polyamide such as polycaproamide (polyamide 6); semiaromatic polyamide such as poly-m-xyleneadipamide (polyamide MXD 6), poly-p-xylyleneadipamide (polyamide PXD 6), polyhexamethyleneisophthalamide (polyamide 6I), polytetramethyleneterephthalamide (polyamide 4T), polypentamethyleneterephthalamide (polyamide 5T), poly-2-methylpentamethyleneterephthalamide (polyamideM-5T), polyhexamethyleneterephthalamide (polyamide 6T), polynonamethyleneterephthalamide (polyamide 9T), polyundecamethyleneterephthalamide (polyamide 11T), polydodecamethyleneterephthalamide (12T), polyamide 6T/12 copolymer, polyamide 6T/11 copolymer, polyamide 6T/6I copolymer, polyamide 6T/6I/12 copolymer, polyamide 6T/610 copolymer and polyamide 6T/6I/6 copolymer; and noncrystalline polyamide such as polyhexamethylenehexahydroterephthalamide (polyamide 6T(H)), polybis(3-methyl-4-aminohexyl)methaneterephthalamide (polyamide PACMT), polybis(3-methyl-4-amino-hexyl)methaneisophthalamide (polyamide PACMI), polybis(3-methyl-4-aminohexyl)methanedodecamide (polyamide PACM 12) and polybis(3-methyl-4-aminohexyl)methanetetradecamide (polyamide PACM 14). As to the polyamide resin (B), it is preferred to be selected from polycaproamide (polyamide 6), poly-m-xyleneadipamide (polyamide MXD 6) and polyamide 6T/6I copolymer in view of easy availability and degree of effects.

Oxygen permeability of a polyamide resin can be judged on the basis of data for gas permeability mentioned in "Handbook of Polyamide Resin, edited by Osamu Fukumoto, published by Nikkan Kogyo Shimbunsha, page 113, 1988" and permachor values taught in "Prediction of gas barrier properties of high polymers, 1986, by M. Salame", "*Polymer Engineering and Science*, vol. 26, no. 22, pages 1543-1546", "Correlation and prediction of gas permeability in glassy polymer membrane materials via a modified free volume based group contribution method, by J. Y. Park and D. R. Poul, 1997", "*Journal of Membrane Science*, vol. 125, pages 23-39", etc.

In addition, the oxygen permeability of the polyamide can be measured by a method mentioned in the Example section.

Ratio by mass of the polyamide (A) to the polyamide (B) or (A)/(B) is from 98/2 to 60/40, preferably from 95/5 to 70/30, and more preferably from 90/10 to 75/25. When the polyamide (B) is less than 2 parts by mass, effects by compounding with the polyamide (B) are hardly expressed while, when it is more than 40 parts by mass, characteristics inherent to the polyamide (A) are deteriorated.

The polyamide resin composition of the present invention may contain other polyamide resin provided that the polyamide resin (A) and the polyamide resin (B) satisfy the above relation and that effects of the present invention are not deteriorated thereby.

Although there is no particular limitation for a molecular weight of the polyamide resin as such, it is preferred to use such a polyamide resin wherein a relative viscosity measured in a concentration of 1% by mass in 98% (98% by mass) sulfuric acid at 25° C. is from 1.7 to 4.5, more preferably from 2.0 to 4.0, and further preferably from 2.0 to 3.5.

The metal cyanide salt in the present invention is shown by the following general composition formula (1):

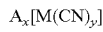   General composition formula (1)

(In the general composition formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A.)

The metal cyanide salt may also be a hydrate.

M in the above general composition formula (1) is at least one member of transition metal elements in groups 5 to 10 and periods 4 to 6 of a periodic table. As to the preferred metal element, there may be exemplified Fe, Co, Cr, Mn, Ir, Rh, Ru, V and Ni. When the valence of metal element is also taken into consideration, Fe (II), Fe(III), Co(III), Cr(III), Mn(II), Mn(III), Ir(III), Rh(III), Ru(II), V(IV), V(V), Co(II), Ni(II) and Cr(II) are preferred. Co(II), Co(III), Fe(II), Fe(III), Cr(III), Ir(III) and Ni(II) are more preferred. Fe(II) and Fe(III) are particularly preferred. Two or more kinds of metal may be present in the metal cyanide salt (e.g., potassium hexacyanocobaltate(II) ferrate (II)). A is at least one member of alkali metal (such as Li, Na and K) and alkaline earth metal (such as Ca and Ba). y is an integer of from 3 to 6. x is selected in such a manner that the metal cyanide salt becomes electrically neutral as a whole. Thus, x is a number calculated by (y−m)/a (wherein m is a valence of M and a is a valence of A). Particularly, y corresponds to a coordination number of M and is preferred to be 4 to 6, and particularly preferred to be 6.

Although examples of the metal cyanide salt which can be used in the present invention are not particularly limited, preferred ones are potassium hexacyanoferrate (II), potassium hexacyanoferrate (III), sodium hexacyanoferrate (II), sodium hexacyanoferrate (III), potassium hexacyanocobaltate (III), sodium hexacyanocobaltate (III), potassium hexacyanoruthenate (II), calcium hexacyanocobaltate (III), potassium tetracyanonickelate (II), potassium hexacyanochromate (III), potassium hexacyanoiridiumate (III), calcium hexacyanoferrate (II), potassium hexacyanocobaltate (II) and lithium hexacyanocobaltate (III). More preferred ones are potassium hexacyanoferrate (II), potassium hexacyanoferrate (III), sodium hexacyanoferrate (II) and sodium hexacyanoferrate (III) in view of handling and safety.

In the present invention, compounding amount (content) of the above metal cyanide salt to 100 parts by mass of a total amount of the polyamide resin (A) and the polyamide resin (B) is 0.5 to 20 part(s) by mass. A lower limit of the compounding amount of the metal cyanide salt is preferably 1 part by mass, more preferably 1.5 parts by mass, and further preferably 2 parts by mass. An upper limit of the compounding amount of the metal cyanide salt is preferably 15 parts by mass, more preferably 13 parts by mass, and further preferably 12 parts by mass.

When the compounding amount of the metal cyanide salt is less than 0.5 part by mass, there is almost no effect of expressing thermal aging resistance while, even when the compounding amount of the metal cyanide salt is more than 20 parts by mass, there is no further increase in thermal aging resistance. When the compounding amount of the metal cyanide salt is 20 parts by mass or less, bad affection to mechanical characteristics is little unlike metal particles and metal oxide particles. Even particularly in the case of a composition reinforced with a glass fiber, breakage of the glass fiber can be suppressed whereby mechanical characteristics are rarely lowered.

When the metal cyanide salt is a hydrate, its compounding amount shall be in terms of the mass as a compound including the water of hydration.

In the present invention, in addition to the metal cyanide salt, known thermostabilizer may also be used.

In the following descriptions concerning the contents of the components, "100 parts by mass of a total amount of the polyamide resin (A) and the polyamide resin (B)" will be abbreviated as "100 parts by mass of the polyamide resins".

As to the copper compound which can be used in the present invention, there may be exemplified copper acetate, copper iodide, copper bromide, copper chloride, copper fluoride, copper laurate and copper stearate. Each of those copper compounds may be used solely or jointly. Copper acetate, copper iodide, copper bromide and copper chloride are preferred and cupric bromide is particularly preferably used. Content of the copper compound to 100 parts by mass of the polyamide resin is 0.0001 to 1 part by mass in terms of copper in the copper compound. When adding amount of the copper compound is less than 0.0001 part by mass, an effect of prevention of discoloration in severer environment under high-temperature atmosphere and ultraviolet irradiation is insufficient while, when adding amount of the copper compound is more than 1 part by mass, the effect of prevention of discoloration under the above severe environment reaches a saturation and, moreover, there is a risk of causing such a problem that metal die and screw, cylinder, etc. of extruders and molding machines are corroded. More preferable content is 0.0005 to 1 part by mass, and further preferable content is 0.0005 to 0.2 part by mass.

Further, when the copper compound is added, it is preferred that an alkali metal halide compound such as potassium iodide or potassium bromide is used together therewith. As a result of such a joint use, separation of copper can be prevented. As to a method for adding the copper compound, addition may be done in any stage of the preparation of the polyamide resin and there is no limitation for the adding method. Thus, for example, any of the following method is acceptable: a method wherein the copper compound is added to an aqueous solution of a material salt of polyamide; a method wherein the copper compound is added by injection into melted polyamide during the course of melt polymerization; and a method wherein, after finishing the polymerization, the polyamide pellets are granulated and blended with powder or master batch of the copper compound, and the resulting mixture is melt-kneaded using an extruder or a molding machine.

It is also possible in the present invention to compound an auxiliary stabilizer such as antioxidant (e.g., antioxidant of a hindered phenol type, antioxidant of a phosphorus type, antioxidant of a sulfur type and antioxidant of an amine type) and a light stabilizer.

As to the antioxidant of a hindered phenol type, known compounds may be used. Each of them may be used either solely or in combination. Among the antioxidants of a hindered phenol type as such, phenol of two or more functions is preferred and a semi-hindered type such as triethylene glycol bis[3-(3-tert-butyl-5-methyl-4-hydroxyphenyl)propionate](Irganox 245) is preferred due to its little discoloration.

When the antioxidant of a hindered phenol type is compounded, its compounding amount (content) to 100 parts by mass of polyamide resin is preferred to be 0.05 to 3 part(s) by mass, and more preferred to be 0.1 to 2 part (s) by mass. When the compounding amount is less than 0.05 part by mass, an effect of preventing thermal discoloration is insufficient. On the other hand, when the compounding amount is more than 3 parts by mass, the effect may reach a saturation or blooming onto the surface of a molded product may happen.

The antioxidant of a phosphorus type is at least one member selected from antioxidants of inorganic and organic phosphorus types. Examples of the antioxidant of an inorganic phosphorus type are hypophosphites such as sodium hypophosphite and a phosphite.

As to the antioxidant of an organic phosphorus type, commercially available antioxidant of an organic phosphorus type in a phosphite type may be used. It is preferred to use a compound containing organic phosphorus which does not generate phosphoric acid by thermal decomposition. As to the compound containing organic phosphorus as such, known compounds may be used.

When the antioxidant of a phosphorus type is compounded, its compounding amount (content) to 100 parts by mass of polyamide resin is preferred to be 0.05 to 3 part(s) by mass, and more preferred to be 0.1 to 2 part (s) by mass. When the compounding amount is less than 0.05 part by mass, an effect of preventing thermal discoloration is insufficient. On the other hand, when the compounding amount is more than 3 parts by mass, flash may be generated in a molded product.

When the antioxidants of inorganic and organic phosphorus types are used together in the present invention, compounding amount of an antioxidant can be made small whereby that is preferred.

As to the antioxidant of an amine type which may be used in the present invention, known compounds may be used. In addition, a secondary arylamine may also be listed as the antioxidant of an amine type. The secondary arylamine stands for an amine compound containing two carbon radicals which are chemically bonded to nitrogen atom, wherein at least one of the carbon radicals or preferably both is/are aromatic group.

When the antioxidant of an amine type is compounded, its compounding amount (content) to 100 parts by mass of polyamide resin is preferred to be 0.05 to 3 part(s) by mass, and more preferred to be 0.1 to 2 part(s) by mass. When the compounding amount is less than 0.05 part by mass, an effect of preventing thermal discoloration is insufficient. On the other hand, when the compounding amount is more than 3 parts by mass, the effect may reach a saturation or blooming onto the surface of a molded product may happen.

As to the antioxidant of a sulfur type which may be used in the present invention, known compounds may be used.

When the antioxidant of a sulfur type is compounded, its compounding amount (content) to 100 parts by mass of polyamide resin is preferred to be 0.05 to 3 part(s) by mass, and more preferred to be 0.1 to 2 part(s) by mass. When the compounding amount is less than 0.05 part by mass, an effect of preventing thermal discoloration is insufficient. On the other hand, when the compounding amount is more than 3 parts by mass, the effect may reach a saturation or blooming onto the surface of a molded product may happen.

Alight stabilizer which may be used in the present invention is preferred to be one or more kind(s) of light stabilizer(s) of a hindered amine type (HALS).

Preferably, HALS is a compound which is derived from a substituted piperidine compound or, particularly, a compound which is derived from an alkyl-substituted piperidyl, piperidinyl or piperazinone compound and a substituted alkoxypiperidinyl compound. As to such compounds, known compounds may be used.

In the present invention, a mixture of secondary arylamine with HAL may be used. Preferred embodiment thereof contains at least two kinds of auxiliary stabilizers in which at least one is selected from secondary aryl amine and at least another is selected from a group of HALS. When the mixture of auxiliary stabilizers is compounded, its whole compounding amount (total content) to 100 parts by mass of polyamide resin is preferred to be 0.5 to 10 part (s) by mass, and more preferred to be 0.5 to 3 part(s) by mass. When the whole compounding amount is less than 0.5 part by mass, an effect of enhancing thermal aging resistance is insufficient. On the other hand, when the whole compounding amount is more than 10 parts by mass, the effect may reach a saturation or blooming onto the surface of a molded product may happen.

In the present invention, it is also possible that strength, rigidity, heat resistance, etc. can be significantly enhanced by addition of a filler. As to the filler as such, there may be exemplified glass fiber, carbon fiber, metal fiber, aramid fiber, asbestos, potassium titanate whisker, wollastonite, glass flakes, glass beads, talc, mica, clay, calcium carbonate, barium sulfate, titanium oxide and aluminum oxide. Among them, glass fiber of a chopped strand type is used preferably.

In compounding the above, its compounding amount (content) to 100 parts by mass of the polyamide resin is preferred to be 5 to 140 parts by mass, and more preferred to be 5 to 100 parts by mass.

Within such an extent that the object of the present invention is not deteriorated, it is possible to add up to about 5 parts by mass of one or more kind(s) of common additive(s) such as ultraviolet absorber (e.g., resorcinol, salicylate, benzotriazole and benzophenone), lubricant, mold-releasing agent, nucleating agent, plasticizer, antistatic agent and coloring agent (e.g., dyes and pigments) to 100 parts by mass of the polyamide resin.

The polyamide resin composition of the present invention may contain each of the above-mentioned ingredients. In the composition excluding the above filler, the total amount of the polyamide resin (A), the polyamide resin (B) and the metal cyanide salt is preferred to be 90% by mass or more, and more preferred to be 95% by mass or more.

In the present invention, there is no particular limitation for a method for adding the above-mentioned metal cyanide salt and other additive to the polyamide resin but any method may be adopted therefor. Examples thereof are a method wherein all ingredients are preliminarily mixed and then kneaded in an extruder or a kneader and a method wherein any several ingredients are kneaded in an extruder or a kneader and the resulting pellets are further kneaded and compounded with other ingredients.

The polyamide resin composition of the present invention exhibits very excellent thermal aging resistance. Specifically, the polyamide resin composition of the present invention exhibits a retention rate of tensile strength of 50% or more even after a thermal treatment at 200° C. for 2000 hours, in a thermal aging test as described in the Example section.

The polyamide resin composition of the present invention can be made into a molded product by, for example, injection molding, extrusion molding, thermal molding, compression molding, or the so-called hollow process represented by blow molding, die slide molding, etc. It is also possible that the molded product as such is made into a molded product by subjecting to a secondary processing such as a welding process including, for example, oscillation welding, hot plate welding or ultrasonic wave welding. Preferred ones are injection molding or blow molding product and a molded product prepared by the secondary processing thereof.

Examples of the use of the molded product of the polyamide resin composition of the present invention in the fields of automobiles and vehicles are cylinder head cover, engine cover, housing for intercooler, valve, end cap, caster, trolley parts, etc.; inspiratory parts such as inspiratory pipe (air duct) or, particularly, inspiratory manifold; connector, wheel, fan wheel, storing container for cooling material and housing or housing member for heat exchanger; radiator, thermostat, coolant, water-supplying pump, heater, fastening element, oil saucer and housing for exhausting system such as muffler and catalyst converter; and timing chain belt front cover, gear box, bearing retainer, gasoline cap, seat parts, headrest, door handle, wiper parts, etc.

In the electric/electronic instrument field, examples are circuit substrate parts, housing, film, conductor, switch, terminal strip, relay, resister, condenser, coil, lamp, diode, LED, transistor, connector, controller, memory, bolt, coil bobbin, plug, plug parts, mechatronics parts, parts for household electric appliances (such as cooking instruments, washer, refrigerator and air conditioner) and sensor.

In the fields relating to daily life and to furniture/building materials, there are exemplified wheel chair and baby car parts as well as parts for legs of a chair, armrest, handrail, window frame and door knob.

EXAMPLES

As hereunder, the present invention will be more specifically illustrated by referring to Examples although the present invention is not limited to those Examples. Measured values mentioned in Examples were measured by the following methods.

(1) Raw Materials Used

Polyamide 66: relative viscosity RV=2.7; Stabamid 27 AE 1K manufactured by Rhodia; (oxygen permeability 80 cm$^3$·mm/m$^2$·day·atm)

Polyamide 6: relative viscosity RV=2.5; TP-4208 manufactured by Shyuusei; (oxygen permeability 40 cm$^3$·mm/m$^2$·day·atm)

Polyamide MXD6: relative viscosity RV=2.1; T-600 manufactured by Toyobo; (oxygen permeability 0.1 cm$^3$·mm/m$^2$·day·atm)

Polyamide 6T/6I: relative viscosity RV=2.1; Grivory G21 manufactured by EMS; (oxygen permeability 30 cm$^3$·mm/m$^2$·day·atm)

Polyamide 1010: relative viscosity RV=2.5; Hiprolon200NN manufactured by Arkema; (oxygen permeability 530 cm$^3$·mm/m$^2$·day·atm)

Potassium ferrocyanide trihydrate (potassium hexacyanoferrate (II) trihydrate), manufactured by Wako Pure Chemical Industries, 99% purity Potassium ferricyanide (potassium hexacyanoferrate (III)), manufactured by Wako Pure Chemical Industries, 99% purity Sodium ferrocyanide decahydrate (sodium hexacyanoferrate (II) decahydrate), manufactured by Wako Pure Chemical Industries, 99% purity Iron (II) oxide, manufactured by Wako Pure Chemical Industries Antioxidant of a phenol type: Irganox 245 manufactured by BASF Cupric bromide, manufactured by Wako Pure Chemical Industries, 99.9% purity Glass fiber: T-275H manufactured by Nippon Electric Glass)

(2) Test Methods

Tensile strength, and tensile elongation at break: A molded product was prepared using IS-100 of Toshiba Machine wherein cylinder temperature was set at 280° C. and wherein die temperature was set at 90° C. The resulting molded product was used for the measurement in accordance with ISO 527-1,2.

Oxygen Permeability: The oxygen permeability was measured using a differential pressure-type device for measuring permeability of gas/vapor and the gas (device: GTR-30XAD2 and G2700T•F manufactured by GTR Tech Co., Ltd., Yanako Technical Science; detector: gas chromatography [thermal conductivity detector]) under conditions wherein a temperature was 23° C.±2° C., an atmospheric pressure was 1 atm, the gas was oxygen gas (in a dry state) and a permeation area was 15.2×10%$^{-4}$ m$^2$ ($\phi$: 4.4×10$^{-2}$ m).

A sample for the measurement was prepared as follows. A molded product in 100 mm×100 mm×2 mm thickness was prepared using IS-100 of Toshiba Machine wherein cylinder temperature was set at 280° C. and wherein die temperature was set at 90° C. The molded product was pressed for 1 minute under a temperature condition of 280° C. using an oil hydraulic heat pressing machine (type WIC manufactured by Shinto Metal Industries) to prepare a film of 150 μm to 400 μm thickness. Further, a test piece was prepared by punching out the film. The test piece was used as a sample for the measurement and subjected to the measurement of oxygen permeability.

Thermal aging test: A test piece was subjected to a thermal treatment in an air oven of a recycling type (NH-401 S, a hot-air cyclic dryer manufactured by Nagano Kagaku Kikai Seisakusho) in accordance with the procedure mentioned in detail in ISO 2578. The test piece was taken out from the oven after predetermined testing hours (1000 and 2000 hours) under the environment of 200° C., cooled down to room temperature and tightly closed in a bag backed with aluminum until preparation for the test was finished. After that, tensile strength, and tensile elongation at break were measured in accordance with ISO 527-1,2. Mean value obtained from three test pieces was adopted.

Each of a retention rate of tensile strength, and a retention rate of tensile elongation at break is a retention rate after subjecting to a thermal treatment of 1000 hours or 2000 hours when the initial value without thermal treatment was assumed to be 100%.

As to the resin composition mentioned as Examples and Comparative Examples, each of the above-mentioned raw materials was compounded in the ratio (ratio by mass) mentioned in Tables 1 and 2 using a biaxial extruder (STS 35 manufactured by Coperion) and subjected to melting and kneading to give pellets (about 2.5 mm diameter and about 2.5 mm length). The resulting pellets were used after drying at 100° C. for 4 hours or more using a hot-air cyclic dryer. Results of the evaluation are shown in Tables 1 and 2.

TABLE 1

| | | Examples | | | | | | | | | |
|---|---|---|---|---|---|---|---|---|---|---|---|
| | | 1 | 2 | 3 | 4 | 5 | 6 | 7 | 8 | 9 | 10 |
| composition | PA66 | 62 | 57 | 57 | 62 | 57 | 57 | 55 | 59 | 52.5 | 57 |
| | PA6 | 5 | 10 | | | | | | 10 | 10 | 10 |
| | MXD6 | | | 10 | | | | | | | |
| | PA6T/6I | | | | 5 | 10 | 10 | 10 | | | |
| | PA1010 | | | | | | | | | | |
| | potassium hexacyanoferrate (II) trihydrate | 3 | 3 | 3 | 3 | 3 | 3 | | 1 | 7.5 | |
| | potassium hexacyanoferrate (III) | | | | | | | 5 | | | |
| | sodium hexacyanoferrate (II) decahydrate | | | | | | | | | | 3 |
| | iron (II) oxide | | | | | | | | | | |
| | antioxidant of phenol type | 0.2 | 0.2 | 0.2 | 0.2 | 0.2 | 0.2 | 0.2 | 0.2 | 0.2 | 0.2 |
| | cupric bromide | 0.02 | 0.02 | 0.02 | 0.02 | 0.02 | | 0.02 | 0.02 | 0.02 | 0.02 |
| | glass fiber | 30 | 30 | 30 | 30 | 30 | 30 | 30 | 30 | 30 | 30 |
| composition | oxygen permeability (cm³ · mm/m² · day · atm) | | | | | | | | | | |
| characteristics | polyamide A | 80 | 80 | 80 | 80 | 80 | 80 | 80 | 80 | 80 | 80 |
| | polyamide B | 40 | 40 | 0.1 | 30 | 30 | 30 | 30 | 40 | 40 | 40 |
| | Initial (without thermal treatment) | | | | | | | | | | |
| | tensile strength (MPa) | 167 | 167 | 187 | 164 | 167 | 165 | 170 | 185 | 164 | 185 |
| | tensile elongation at break (%) | 2.6 | 2.8 | 2.8 | 2.6 | 2.8 | 2.8 | 2.8 | 2.7 | 2.1 | 2.8 |
| | after thermal treatment at 200° C. × 1000 hours | | | | | | | | | | |
| | tensile strength (MPa) | 176 | 192 | 195 | 140 | 147 | 142 | 145 | 184 | 169 | 188 |
| | tensile elongation at break (%) | 2.0 | 2.7 | 2.3 | 1.8 | 1.8 | 1.6 | 1.7 | 2.6 | 2.1 | 2.7 |
| | retention rate of tensile strength (%) | 105 | 115 | 104 | 85 | 88 | 86 | 85 | 99 | 103 | 102 |
| | retention rate of tensile elongation at break (%) | 77 | 96 | 82 | 69 | 64 | 57 | 61 | 96 | 100 | 96 |
| | after thermal treatment at 200° C. × 2000 hours | | | | | | | | | | |
| | tensile strength (MPa) | 101 | 133 | 159 | 110 | 141 | 125 | 140 | 140 | 110 | 132 |
| | tensile elongation at break (%) | 1.3 | 1.4 | 1.9 | 1.5 | 1.7 | 1.5 | 1.7 | 1.6 | 1.3 | 1.4 |
| | retention rate of tensile strength (%) | 60 | 80 | 85 | 67 | 84 | 76 | 82 | 76 | 67 | 71 |
| | retention rate of tensile elongation at break (%) | 50 | 50 | 68 | 58 | 61 | 54 | 61 | 59 | 62 | 50 |

TABLE 2

| | | Examples | | | Comparative Examples | | | | | |
|---|---|---|---|---|---|---|---|---|---|---|
| | | 11 | 12 | 13 | 1 | 2 | 3 | 4 | 5 | 6 |
| composition | PA66 | 52 | | | 67 | 57 | 62 | | 57 | 60 |
| | PA6 | 15 | 62 | 57 | | | | | 10 | 10 |
| | MXD6 | | | 10 | | | | | | |
| | PA6T/6I | | 5 | | | | | | | |
| | PA1010 | | | | | | 10 | 5 | 10 | |
| | potassium hexacyanoferrate (II) trihydrate | 3 | 3 | 3 | 3 | 3 | 3 | 3 | | |
| | potassium hexacyanoferrate (III) | | | | | | | | | |
| | sodium hexacyanoferrate (II) decahydrate | | | | | | | | | |
| | iron (II) oxide | | | | | | | | 3 | |
| | antioxidant of phenol type | 0.2 | 0.2 | 0.2 | 0.2 | 0.2 | 0.2 | 0.2 | 0.2 | 0.2 |
| | cupric bromide | 0.02 | 0.02 | 0.02 | | 0.02 | 0.02 | 0.02 | 0.02 | 0.02 |
| | glass fiber | 30 | 30 | 30 | 30 | 30 | 30 | 30 | 30 | 30 |
| composition | oxygen permeability (cm³ · mm/m² · day · atm) | | | | | | | | | |
| characteristics | polyamide A | 80 | 40 | 40 | 80 | 80 | 80 | 40 | 80 | 80 |
| | polyamide B | 40 | 30 | 0.1 | — | 530 | 530 | 530 | 40 | 40 |
| | Initial (without thermal treatment) | | | | | | | | | |
| | tensile strength (MPa) | 175 | 165 | 175 | 193 | 173 | 176 | 185 | 145 | 187 |
| | tensile elongation at break (%) | 2.6 | 2.8 | 2.5 | 2.8 | 2.8 | 2.6 | 2.8 | 1.6 | 3.7 |
| | after thermal treatment at 200° C. × 1000 hours | | | | | | | | | |
| | tensile strength (MPa) | 180 | 168 | 170 | 143 | 157 | 162 | 168 | 132 | 126 |
| | tensile elongation at break (%) | 2.4 | 2.0 | 1.8 | 1.8 | 1.8 | 1.8 | 1.8 | 1.5 | 1.2 |
| | retention rate of tensile strength (%) | 103 | 102 | 97 | 74 | 91 | 92 | 91 | 91 | 67 |
| | retention rate of tensile elongation at break (%) | 92 | 71 | 72 | 64 | 64 | 69 | 64 | 94 | 32 |
| | after thermal treatment at 200° C. × 2000 hours | | | | | | | | | |
| | tensile strength (MPa) | 155 | 125 | 140 | 63 | 68 | 79 | 85 | 15 | 60 |
| | tensile elongation at break (%) | 2.3 | 1.2 | 1.1 | 1.0 | 0.8 | 0.8 | 0.8 | 0.2 | 0.7 |
| | retention rate of tensile strength (%) | 89 | 74 | 82 | 33 | 39 | 45 | 46 | 10 | 32 |
| | retention rate of tensile elongation at break (%) | 88 | 60 | 61 | 36 | 29 | 31 | 29 | 13 | 19 |

In Examples 1 to 11, polyamide which exhibits lower oxygen permeability than polyamide 66 is blended with polyamide 66. In Examples 1 to 11, tensile strength, and tensile elongation at break in the initial stage (before the thermal treatment) are high, and a retention rate of tensile strength, and a retention rate of tensile elongation at break after the thermal treatment at 200° C. for 1000 hours and 2000 hours are also high.

In Examples 12 and 13, polyamide which exhibits lower oxygen permeability than polyamide 6 is blended with polyamide 6. In Examples 12 and 13, tensile strength, and tensile elongation at break in the initial stage (before the thermal treatment) are high, and a retention rate of tensile strength, and a retention rate of tensile elongation at break after the thermal treatment at 200° C. for 1000 hours and 2000 hours are also high.

In Comparative Example 1, only polyamide 66 is used. In Comparative Example 1, a retention rate of tensile strength, and a retention rate of tensile elongation at break after 1000 hours at 200° C. are high, but a retention rate of tensile strength, and a retention rate of tensile elongation at break after 2000 hours at 200° C. tend to be low.

In Comparative Examples 2 and 3, polyamide which exhibits higher oxygen permeability than polyamide 66 is blended with polyamide 66. In Comparative Examples 2 and 3, a retention rate of tensile strength, and a retention rate of tensile elongation at break after 1000 hours at 200° C. are high, but a retention rate of tensile strength, and a retention rate of tensile elongation at break after 2000 hours at 200° C. tend to be low.

In Comparative Example 4, polyamide which exhibits higher oxygen permeability than polyamide 6 is blended with polyamide 6. In Comparative Example 4, a retention rate of tensile strength, and a retention rate of tensile elongation at break after 1000 hours at 200° C. are high, but a retention rate of tensile strength, and a retention rate of tensile elongation at break after 2000 hours at 200° C. tend to be low.

Comparative Example 5 is an example wherein metal cyanide salt is not added and iron (II) oxide is added instead. In Comparative Example 5, tensile strength, and tensile elongation at break in the initial stage are low compared with Examples, and a retention rate of tensile strength, and a retention rate of tensile elongation at break after 2000 hours at 200° C. are significantly low.

Comparative Example 6 is an example wherein metal cyanide salt is not added. In Comparative Example 6, a retention rate of tensile strength, and a retention rate of tensile elongation at break after 1000 hours at 200° C. are significantly low.

INDUSTRIAL APPLICABILITY

In accordance with the present invention, thermal aging resistance of a polyamide resin under high-temperature environment of about 200° C. can be easily and stably enhanced. Accordingly, the polyamide resin composition obtained by the present invention can be utilized for parts of automobiles and electric/electronic products which have a possibility of being exposed to the environment of 200° C.

The invention claimed is:

1. A polyamide resin composition comprising a polyamide resin (A), another polyamide resin (B) which exhibits lower oxygen permeability than the polyamide resin (A), and a metal cyanide salt of Formula (1):

$$A_x[M(CN)_y], \quad \text{Formula (1)}$$

wherein in the Formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A, wherein a ratio by mass (A)/(B) of the polyamide resin (A) to the polyamide resin (B) is from 98/2 to 60/40, wherein the polyamide resin composition comprises 0.5 to 20 part(s) by mass of the metal cyanide salt of Formula (1) with respect to 100 parts by mass of a total amount of the polyamide resin (A) and the polyamide resin (B), and wherein the polyamide resin composition excludes clay.

2. The polyamide resin composition according to claim 1, wherein M in the Formula (1) is iron.

3. The polyamide resin composition according to claim 1, wherein the metal cyanide salt in the Formula (1) is one or more member(s) selected from the group consisting of alkali metal hexacyanoferrate (II) and alkali metal hexacyanoferrate (III).

4. The polyamide resin composition according to claim 1, wherein, to 100 parts by mass of the total amount of the polyamide resin (A) and the polyamide resin (B), a copper compound is compounded in an amount of 0.0001 to 1 part by mass as copper.

5. The polyamide resin composition according to claim 1, wherein, the polyamide resin (A) is polyhexamethyleneadipamide.

6. A method for enhancing thermal aging resistance of a polyamide resin composition, wherein the polyamide resin composition contains a polyamide resin (A) and another polyamide resin (B) which exhibits lower oxygen permeability than the polyamide resin (A), wherein a ratio by mass (A)/(B) of the polyamide resin (A) to the polyamide resin (B) is from 98/2 to 60/40, said method comprising adding to the polyamide resin composition 0.5 to 20 part(s) by mass of a metal cyanide salt of Formula (1) with respect to 100 parts by mass of a total amount of the polyamide resin (A) and the polyamide resin (B):

$$A_x[M(CN)_y], \quad \text{Formula (1)}$$

wherein in the Formula (1), M is at least one member of transition metal elements in groups 5 to 10 and periods 4 to 6 of a periodic table; A is at least one member of alkali metal and alkaline earth metal; y is an integer of from 3 to 6; and x is a number calculated by (y−m)/a, wherein m is a valence of M and a is a valence of A and wherein the polyamide resin composition excludes clay.

* * * * *